US012679462B2

(12) United States Patent
Blaschke et al.

(10) Patent No.: US 12,679,462 B2
(45) Date of Patent: Jul. 14, 2026

(54) MOTOR CAR WITH A FASTENING ARRANGEMENT FOR FASTENING A SUBFRAME FOR A VEHICLE AXLE TO A BODY OF THE MOTOR CAR

(71) Applicant: Mercedes-Benz Group AG, Stuttgart (DE)

(72) Inventors: Julian Blaschke, Holzgerlingen (DE); Dietmar Kallfass, Ammerbuch (DE); Thomas Schmid, Gaertringen (DE); Pascal Collins, Leonberg (DE); Eric Schneider, Sindelfingen (DE); Gernot Kurtzer, Herrsching (DE); Michael Wirsing, Gechingen (DE); Waldemar Markstaedter, Ludwigsburg (DE)

(73) Assignee: Mercedes-Benz Group AG, Stuttgart (DE)

( * ) Notice: Subject to any disclaimer, the term of this patent is extended or adjusted under 35 U.S.C. 154(b) by 27 days.

(21) Appl. No.: 18/717,840

(22) PCT Filed: Dec. 13, 2021

(86) PCT No.: PCT/EP2021/085351
§ 371 (c)(1),
(2) Date: Jun. 7, 2024

(87) PCT Pub. No.: WO2023/110050
PCT Pub. Date: Jun. 22, 2023

(65) Prior Publication Data
US 2025/0042473 A1     Feb. 6, 2025

(51) Int. Cl.
B62D 21/11     (2006.01)
B60K 1/04     (2019.01)
B62D 21/15     (2006.01)

(52) U.S. Cl.
CPC ................ B62D 21/11 (2013.01); B60K 1/04 (2013.01); B62D 21/155 (2013.01); B60K 2001/0438 (2013.01); B60Y 2306/01 (2013.01)

(58) Field of Classification Search
CPC ........ B62D 21/11; B62D 21/155; B60K 1/04; B60K 2001/0438; B60Y 2306/01
See application file for complete search history.

(56) References Cited

U.S. PATENT DOCUMENTS 6,631,775 B1 * 10/2003 Chaney ................... B60L 53/80
                                                         280/783
7,393,016 B2     7/2008 Mitsui et al.
(Continued)

FOREIGN PATENT DOCUMENTS

DE            693 02 845 T2     11/1996
DE     10 2013 204 757 A1     9/2013
(Continued)

OTHER PUBLICATIONS

DE-102019207243-A1 (machine translation) (Year: 2020).*
(Continued)

*Primary Examiner* — Jason D Shanske
*Assistant Examiner* — Joselynn Y Sliteris
(74) *Attorney, Agent, or Firm* — Crowell & Moring LLP

(57) ABSTRACT

A motor car with a body and a fastening arrangement for fastening a subframe for a vehicle axle to the body. The subframe has respective side members and cross members and adjoins a body structure element by way of a region. An underfloor energy storage unit for an electric drive of the motor car adjoins the subframe. The subframe has a support device with a support element which support device supports the subframe on the body structure element in the event of an accident-induced movement in a direction towards the center of the motor car. The support element is arranged on (Continued)

the upper side of one of the side members and at a distance from the body structure element. In the assembled state there is a distance between the subframe and the energy storage unit which is greater than the distance between the support element and the body structure element.

8 Claims, 4 Drawing Sheets

(56) References Cited

U.S. PATENT DOCUMENTS

| | | | |
|---|---|---|---|
| 7,461,850 B2 | 12/2008 | Kurth | |
| 7,886,861 B2 * | 2/2011 | Nozaki | B60K 1/00 |
| | | | 280/783 |
| 8,708,401 B2 | 4/2014 | Lee et al. | |
| 9,708,006 B2 * | 7/2017 | Schmalzrieth | B60K 15/03006 |
| 10,766,539 B2 | 9/2020 | Sawatzki et al. | |
| 10,988,036 B2 | 4/2021 | Park et al. | |
| 11,027,782 B2 * | 6/2021 | Fujii | B62D 25/08 |
| 11,124,135 B2 * | 9/2021 | Yamada | B60L 50/64 |
| 11,192,437 B1 * | 12/2021 | Butron Luz | B60K 1/04 |
| 12,240,311 B2 * | 3/2025 | Eichinger | H01M 50/249 |
| 12,263,887 B2 * | 4/2025 | Suzuki | B62D 21/155 |

| | | | | |
|---|---|---|---|---|
| 2003/0070858 A1 * | 4/2003 | Kondo | B60L 50/71 |
| | | | | 180/291 |
| 2013/0300152 A1 | 11/2013 | Nortmann et al. | |
| 2017/0073014 A1 | 3/2017 | Alwan et al. | |
| 2021/0347241 A1 | 11/2021 | Hashida et al. | |

FOREIGN PATENT DOCUMENTS

| | | | | | |
|---|---|---|---|---|---|
| DE | 10 2015 013 533 | B3 | 9/2016 | | |
| DE | 10 2016 000 669 | B3 | 1/2017 | | |
| DE | 10 2017 222 225 | A1 | 6/2019 | | |
| DE | 10 2018 208 803 | A1 | 12/2019 | | |
| DE | 102019207243 | A1 * | 11/2020 | | B62D 21/155 |
| EP | 0 559 176 | B1 | 9/1993 | | |
| EP | 1 733 951 | B1 | 12/2006 | | |
| FR | 2 928 127 | A1 | 9/2009 | | |
| FR | 3 055 299 | A1 | 3/2018 | | |

OTHER PUBLICATIONS

International Search Report (PCT/ISA/210) issued in PCT Application No. PCT/EP2021/085351 dated Aug. 3, 2022 (3 pages).
German-language German Office Action issued in German Application No. 10 2020 007 854.0 dated Sep. 16, 2021 (6 pages).

* cited by examiner

MOTOR CAR WITH A FASTENING ARRANGEMENT FOR FASTENING A SUBFRAME FOR A VEHICLE AXLE TO A BODY OF THE MOTOR CAR

BACKGROUND AND SUMMARY OF THE INVENTION

The invention relates to a motor car with a body, a fastening arrangement for fastening a subframe for a vehicle axle to the body, and an underfloor energy storage unit.

DE 10 2016 000 669 B3 discloses a subframe for a rear axle, which is composed of respective side members and cross members and adjoins a body structure element of the body of the motor car by way of a region. To protect a traction battery of the electrically operated motor car, which is arranged in an underfloor arrangement underneath the vehicle floor, from damage caused by a rear-end collision, at least one of the subframe side members is extended towards the front in the vehicle longitudinal direction with a subframe-side bearing component, which is connected to a battery housing-side bearing component with the interposition of a vibration damper.

As this prior art already shows, in electrically operated passenger cars in which an electric energy storage unit is arranged in an underfloor arrangement underneath the vehicle floor, for example, it is difficult to avoid excessive damage to the energy storage unit in the event of an accident-induced forward displacement of the subframe for the rear vehicle axle due to the respective component parts and/or components of the subframe hitting each other. In addition to the safety aspects, in particular weight aspects must also be taken into consideration, so that the electrically operated motor car has a suitably long range.

A motor car with a subframe is known from DE 10 2017 222 225 A1, which has a sliding slope and, in the event of a collision-induced rearward displacement, slides along an opposite surface inclined obliquely downwards towards the roadway, so that the subframe is finally displaced under a passenger compartment.

The problem addressed by the present invention is that of creating a motor car with a fastening arrangement of the type specified in the introduction, by means of which an excessive accident-induced movement or displacement of the subframe in the direction towards the center of the vehicle can be avoided reliably and by way of a lightweight solution.

The motor car according to the invention comprises a body and a fastening arrangement for fastening a subframe for a vehicle axle to the body, in which the subframe comprises respective side members and cross members and adjoins a body structure element, in particular a cross member, by way of a region. The motor car also comprises an underfloor energy storage unit for an electric drive of the motor car, adjoining which is the subframe for the vehicle axle.

To create a fastening arrangement for fastening a subframe comprising at least respective cross members and side members and adjoining a body structure element, which subframe is protected particularly expediently from excessive accident-induced displacement or movement in the direction towards the center of the vehicle and moreover represents a particularly lightweight solution, it is provided according to the invention that the subframe has a support device with at least one support element, which support device supports the subframe on the body structure element, in particular a cross member, in an accident-induced movement in the direction towards the center of the vehicle, and that the at least one support element is arranged on the upper side of one of the side members and at a distance from the body structure element. If, for example, a rear-end collision results in an accident-induced forward displacement of the subframe in the vehicle longitudinal direction, i.e., in the direction towards the center of the vehicle, the support device ensures that the subframe is supported on the body, in particular on a cross member of the body, in order, on the one hand, to reduce the forward displacement of the subframe and, on the other hand, to ensure that the body of the motor car absorbs the accident forces introduced by the subframe in a particularly favourable and early manner. By suitably supporting the support device on a respective structural body part of the motor car body, in particular on a cross member of the motor car body, load paths that have not been used to date are therefore made available in order for the motor car body to be able to absorb the accident forces introduced as a result of the displacement or movement of the subframe while absorbing the energy introduced. In particular, transverse load paths that would otherwise remain unused in the rear-end crash are included in the crash kinematics. This has the advantage in particular that the additional weight for these protective measures is only to be seen in the additionally provided support device and can therefore be kept very small in order to nevertheless have a very positive effect on the level of protection to be achieved. Thus, in particular in the event of a rear-end collision, this means that the support device can be integrally supported on the corresponding structural body part, in particular the corresponding bodyshell cross member, during the accident scenario. This prevents excessive forward displacement of the subframe of the rear axle and thus protects, for example, the energy storage unit from coming into hard contact with the subframe or components supported by the latter, such as for example an electric drive unit or other components of the electric drivetrain.

It is further provided according to the invention that in the assembled state there is a distance (A) between the subframe, in particular a cross member of the subframe, and the energy storage unit which is greater than the distance between the at least one support element on the upper side of the side member of the subframe and the body structure element, in particular a cross member, of the body. Owing to this design, a hard contact between the subframe and the electric energy storage unit can be avoided. It has been shown according to experience that specifically in the case of electric energy storage units, there is a great need to prevent damage to the energy storage unit caused by the subframe in the event of an accident-induced displacement towards the center of the vehicle, for example an accident-induced forward displacement in the case of a rear axle subframe, and any associated damage to the energy storage unit.

The arrangement of the at least one support element on the upper side of one of the side members of the subframe enables the body cross member to be contacted early in the case of a crash and thus offers the desired support for the subframe, for example to protect an electric energy storage unit arranged in the underfloor region of the vehicle.

An advantageous embodiment of the invention provides that the at least one support element is arranged at a distance from the body structure element, in particular the cross member. This means that the at least one support element or the support device only comes into contact with the body structure element/cross member for the first time in the course of the accident-induced displacement or movement of the subframe, after which corresponding forces are transferred between the subframe and the body via the support device. Such an arrangement of the at least one support element has the particular advantage that noise between the subframe and the body can be avoided.

Furthermore, it has been shown to be advantageous if one support element is arranged on each of the two side members of the subframe. This means that the load paths on both sides of the vehicle can be activated in a particularly favourable manner if accident-induced force is applied to the subframe. In addition, accident forces or displacement movements of the subframe that are introduced unevenly into the two side members of the subframe and that occur, for example, in the event of a collision and involve a small overlap of the width of the car with an accident partner or obstacle, can be introduced into the body in an improved manner.

In a further embodiment of the invention, the at least one support element of the support device is designed as an energy absorption element for the targeted absorption of accident energy when providing support on the body structure element/cross member. As a result, additional accident energy can be absorbed by means of the support device or the respective support element.

A further advantageous embodiment of the invention provides that respective side members of the motor car body are connected to the cross member that extends transversely thereto. As a result, forces which are introduced via the support device into the cross member can be transferred in a particularly advantageous manner to the respective side member. In other words, this results in particularly favourable load paths through the respective side members of the motor car body.

In this connection it has been shown to be further advantageous when the cross member has mounting regions adjoining the respective laterally associated side members, on which the respective laterally associated support element provides support in the event of an accident-induced movement of the subframe in the direction towards the center of the vehicle. This results in the advantage of a very stable support of the support elements on the cross member near to the respective laterally associated side member.

It has also been shown to be advantageous when the at least one support element of the support device is designed as a sheet-metal formed part. Such sheet-metal formed components can be manufactured particularly cost-effectively and are moreover highly effective in terms of their function. They can, for example, also be simply designed as energy absorption elements and can be easily connected to the subframe during the production process.

Furthermore, it has been shown to be advantageous when the at least one support element is arranged on a region of the subframe, in particular of the respective side member of the subframe, which slopes downwards towards the center of the vehicle. In the event of an accident-induced displacement of the subframe towards the center of the vehicle, this thus results in a particularly favourable support of the respective support element on the subframe, in particular on the respective side member.

However, within the scope of the invention it should also be considered that the fastening arrangement can also be used in vehicles with other drive units in which an accident-induced displacement of the subframe towards the center of the vehicle, in particular an accident-induced forward displacement of a rear axle subframe, is to be avoided. Moreover can the subframe can be provided not only for the rear axle, but for example also in the region of the front-end structure of the motor car as a front axle carrier, engine mount or integral carrier.

A particularly advantageous exemplary embodiment of the motor car according to the invention with an exemplary embodiment of a fastening arrangement is explained in greater detail hereinafter with reference to the drawings.

DETAILED DESCRIPTION OF THE DRAWINGS

Figure 1:
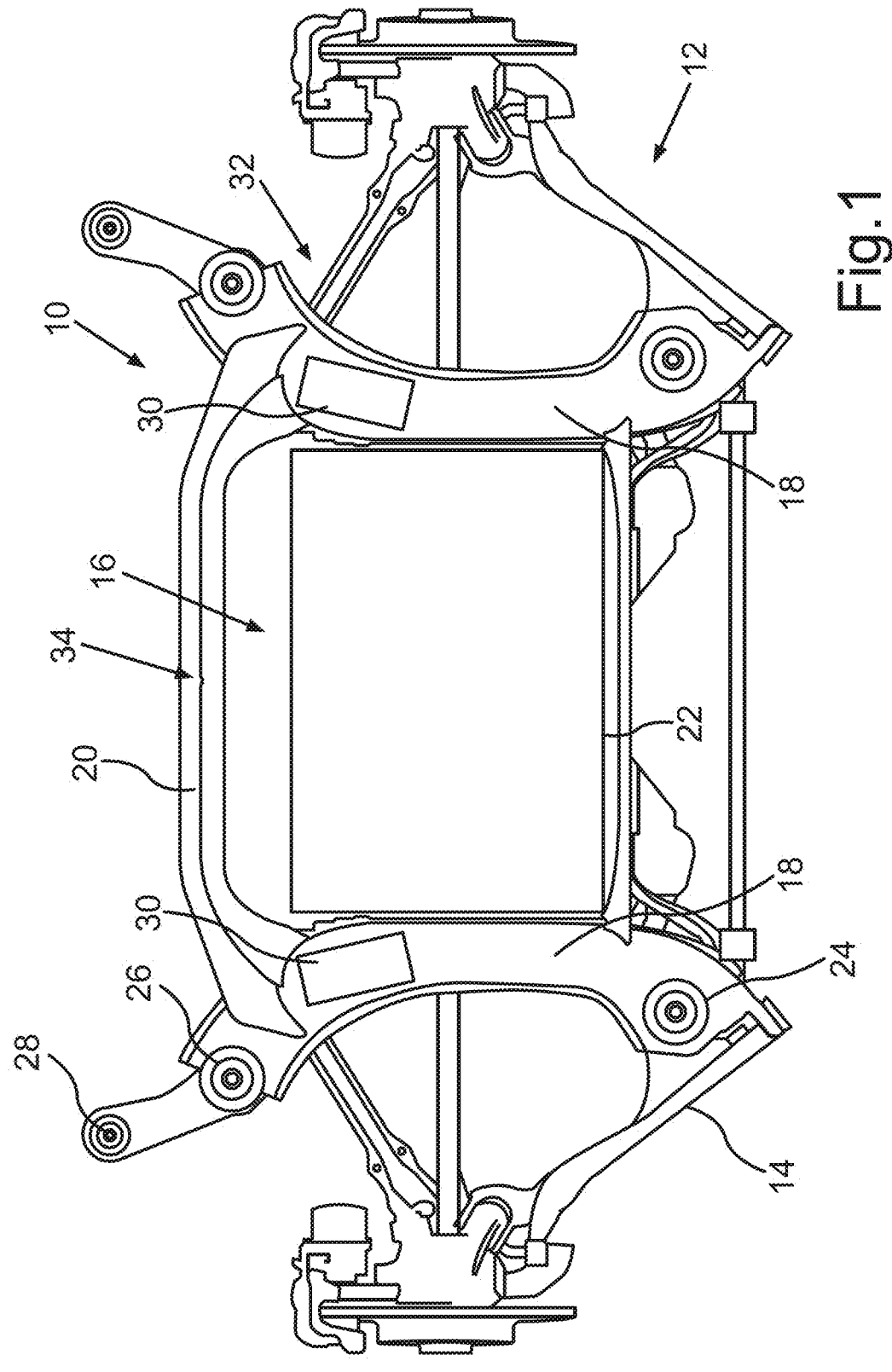
FIG. 1 shows a plan view of a subframe of a rear vehicle axle of an electrically driveable motor car, with components of an electric drivetrain moreover being arranged on the subframe.

FIG. 1 illustrates a plan view of a subframe 10 for a rear vehicle axle 12 of an electrically driveable passenger car. Such a subframe 10 is also referred to as a rear axle carrier, integral carrier, axle bracket or the like. In the present case, not only can the respective axle members such as control arms 14 and the like of the rear axle 12 be seen, but moreover also components 16 of an electric drivetrain for driving the rear axle 12.

The subframe 10 comprises in the present case respective side members 18, which are connected to one another via a front cross member 20 and a rear cross member 22. Respective bearing elements 24, 26 and additional bearing elements 28, via which the subframe 10 is connected to the motor car body of the passenger car, can furthermore be seen.

A support element 30 of a support device 32 is arranged on the upper side of each of the two side members 18 of the subframe 10, i.e., on their upper side facing away from the roadway, which are preferably of identical construction and are described in more detail below, in particular in a combined view with FIG. 2, in which one of the support elements 30 can be seen in more detail.

Figure 2:
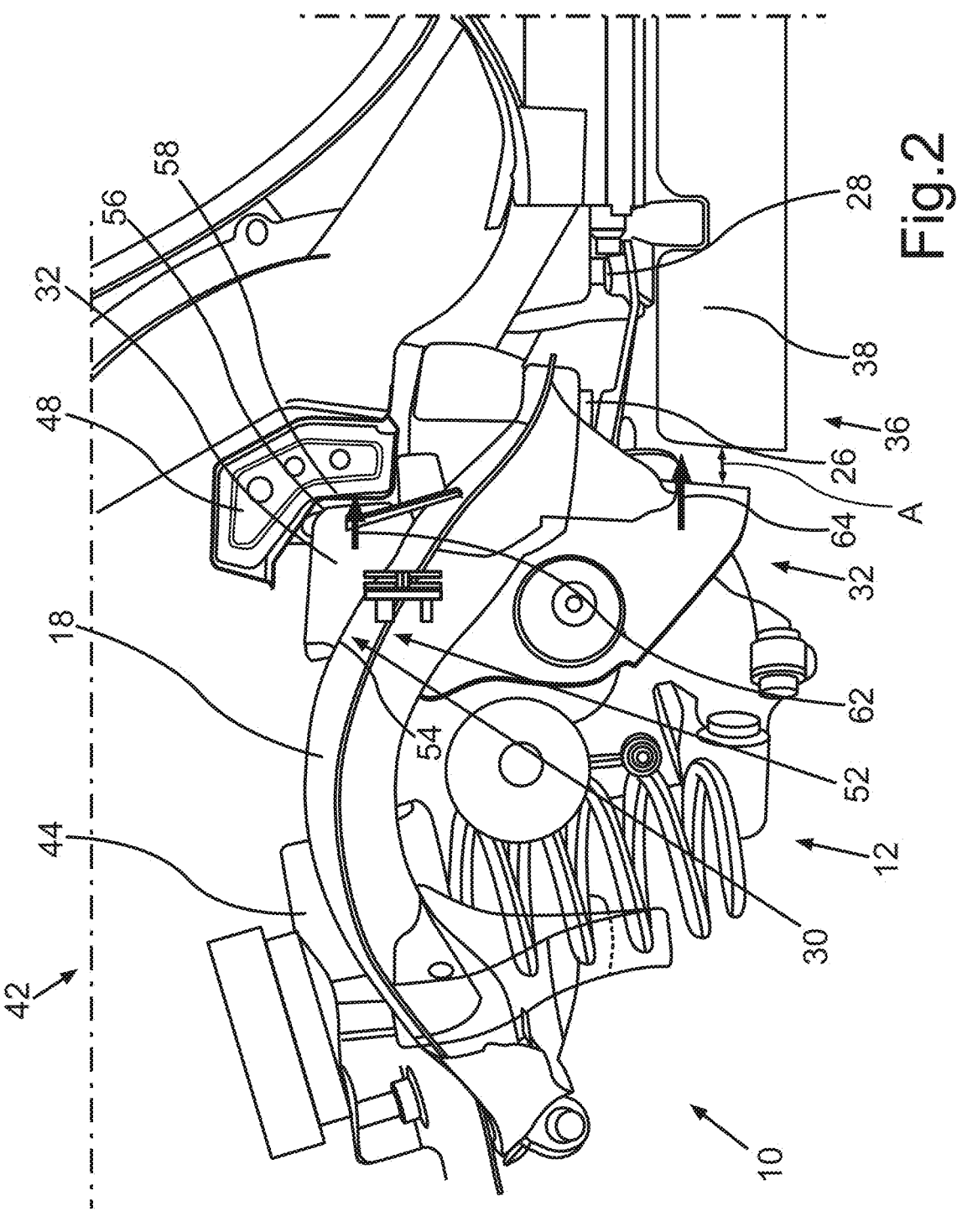
FIG. 2 shows a perspective illustration of a sectional side view of a motor car body of a passenger car with a rear axle subframe according to FIG. 1 arranged thereon, a front end region of which subframe adjoins a cross member of the motor car body and on each of the side members of which subframe a respective support element of a support device is arranged, which supports the subframe on the cross member in the event of an accident-induced forward displacement in direction towards the center of the vehicle.

FIG. 2 shows the fastening arrangement of the subframe 10 on a rear structure a motor car body of a passenger car in a sectional side view. Firstly, it can be seen that the subframe 10 with its front end region 34 and components arranged in this end region 34, i.e., for example the components 16 of the electric drivetrain, adjoins a rear end region 36 of an electric energy storage unit 38 in the form of a high-voltage storage unit that is fastened in an underfloor arrangement on the underside of the vehicle floor. The energy storage unit 38 is arranged in this case, for example, between respective side sills underneath the passenger compartment of the motor car.

Figure 3:
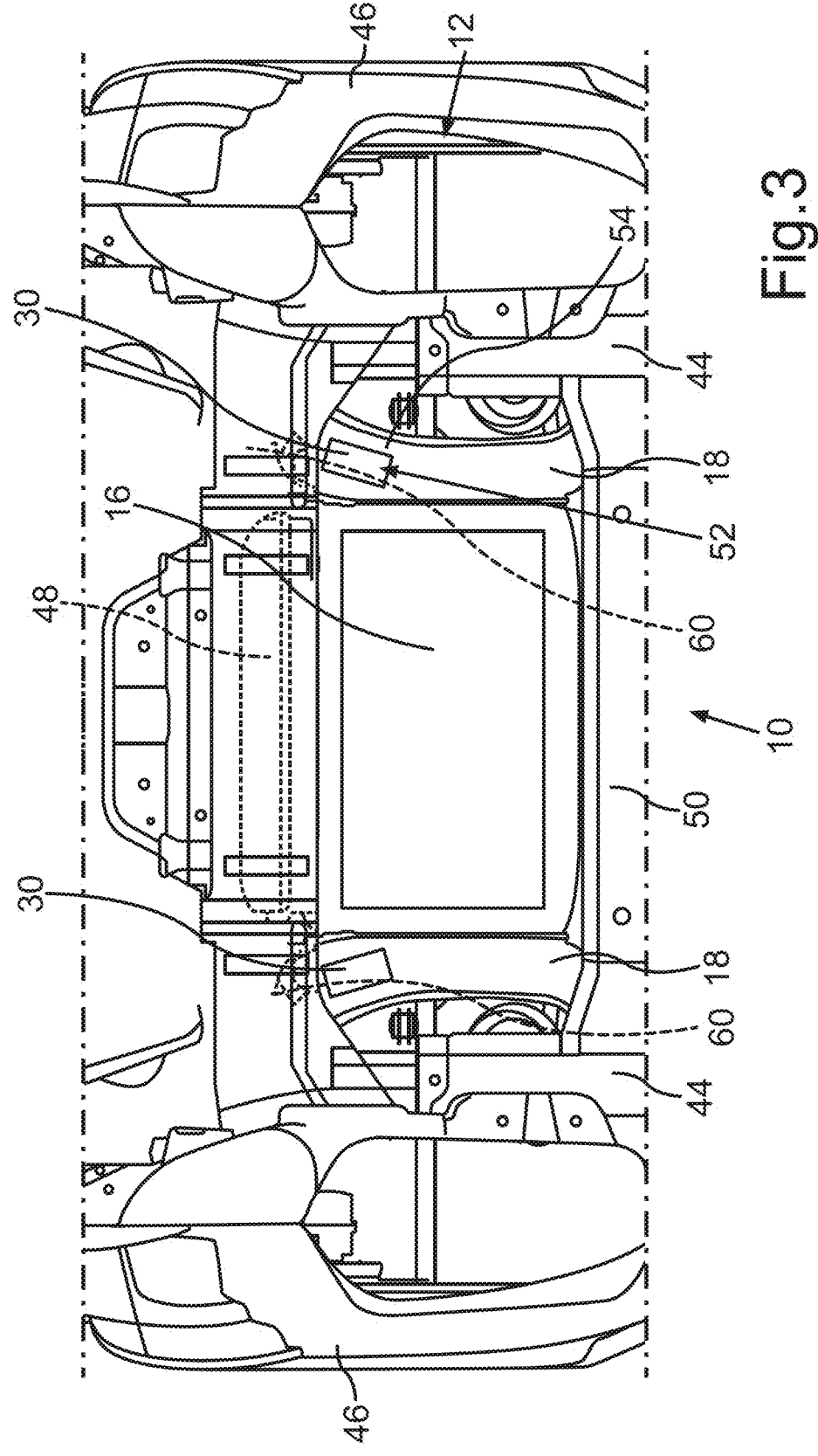
FIG. 3 shows a sectional plan view of the fastening arrangement according to FIG. 2, showing, in particular, the arrangement of the side members and of the support elements arranged above them in the vehicle transverse direction within the respective side members of the motor car body, between which side members the cross member, on which the support elements provide support in the event of an accident-induced forward displacement of the subframe, extends.

In the present case, the rear structure 42 the passenger car, which is illustrated in FIG. 3 in a sectional plan view including the subframe 10 arranged therebelow and the associated component parts and components of the rear axle 12 or of the electronic drivetrain, has respective rear side members 44 which extend on the inside of respective wheel arches 46 for the rear wheels. In this case, the side members 44 are connected to each other in a front region near the passenger compartment via a front cross member 48 which extends in the vehicle transverse direction (y direction in the vehicle coordinate system) and approximately horizontally between the side members 44. A further cross member 50 is arranged at a distance in the vehicle longitudinal direction (x direction in the vehicle coordinate system) behind the front cross member 48 and likewise extends between the two side members 44.

It can be seen from FIG. 2 that the front cross member 48 has an at least substantially inverted L-shaped cross-section. It can furthermore be seen that the subframe 10 adjoins the front cross member 48 with a front upper region 52, which in the present case is substantially formed by the respective side members 18.

In the present case, the two support elements 30 of the support device 32 are arranged in this region 52 of the subframe 10 or of the respective side member 18 adjoining the cross member 48—as can be seen in particular from FIG. 2.

In the present exemplary embodiment, in this case the two support elements 30 are substantially triangular or ramp-shaped in the lateral cross-section—as can be seen from FIG. 2. In this case, each of the support elements 30 is arranged on region 54 of the respective side members 18 of the subframe 10 that slopes downwards towards the center of the vehicle or towards the front. Moreover, it can be seen that the respective support elements 30 extend with a respective end face 56 near a flank 58 of the cross member 48. In the present exemplary embodiment, a small distance is provided between the end face 56 of the respective support element 30 and the flank 58 of the cross member 48, i.e., in the present case, the support elements 30 do not directly adjoin the cross member 48. Alternatively, it would however also be conceivable in principle that the support elements 30 directly adjoin the cross member 48 or that the support elements 30 are also directly connected to the cross member 48, for example via respective joined connections, mechanical connections or the like. It should also be noted that the respective support element 30 is arranged in the vertical direction of the vehicle (z direction in the vehicle coordinate system) on a level with the cross member 48 or the flank 58 thereof, i.e., that the end face 56 of the respective support element 30 is arranged in a position opposite the flank 58 of the cross member 48.

It can also be seen from FIG. 2 that the subframe 10 is arranged in the assembled state with its front end region 34, in particular also with its front cross member 20, in a position opposite the rear end region 36 of the electric energy storage unit 38. In this case, a distance A is provided between the subframe 10 and the electric energy storage unit 38 in the vehicle longitudinal direction (x direction in the vehicle coordinate system). This distance A is so large that, in the event of a vehicle collision with an accompanying crash-induced displacement and/or deformation of the subframe 10 in the direction of the cross member 48, at least one of the support elements 30 arranged on the upper side of the side member 18 of the subframe 10 provides support on the cross member 48 of the body, specifically before the subframe 10 strikes against the electric energy storage unit 38. In this context, "support" is understood as meaning that the support elements 30 on the subframe 10 transfer the crash forces via the cross member 48 into the body and also into other body load-bearing structures. It should be noted that, under certain circumstances, the extent of the crash-induced displacement of the subframe 10 in the direction of the electric energy storage unit 38 can be advantageously reduced by means of the support elements 30 according to the invention. In any case, it is ensured that the crash forces are already introduced into the body via the support elements 30 before the subframe 10 hits the energy storage unit 38, so that the subframe 10 is prevented from making hard contact with the energy storage unit 38.

In particular it can also be seen from FIG. 3 that the side members 18 of the subframe 10 extend in the region 54, in which the support elements 30 are arranged, on the inside of the respective side member 44 of the rear structure 42 of the motor car body. Therefore, the support elements 30 are arranged in a respective mounting region 60 of the cross member 48, which is near the respective connection to the laterally adjacent side member 44 of the rear structure 42.

Figure 4:
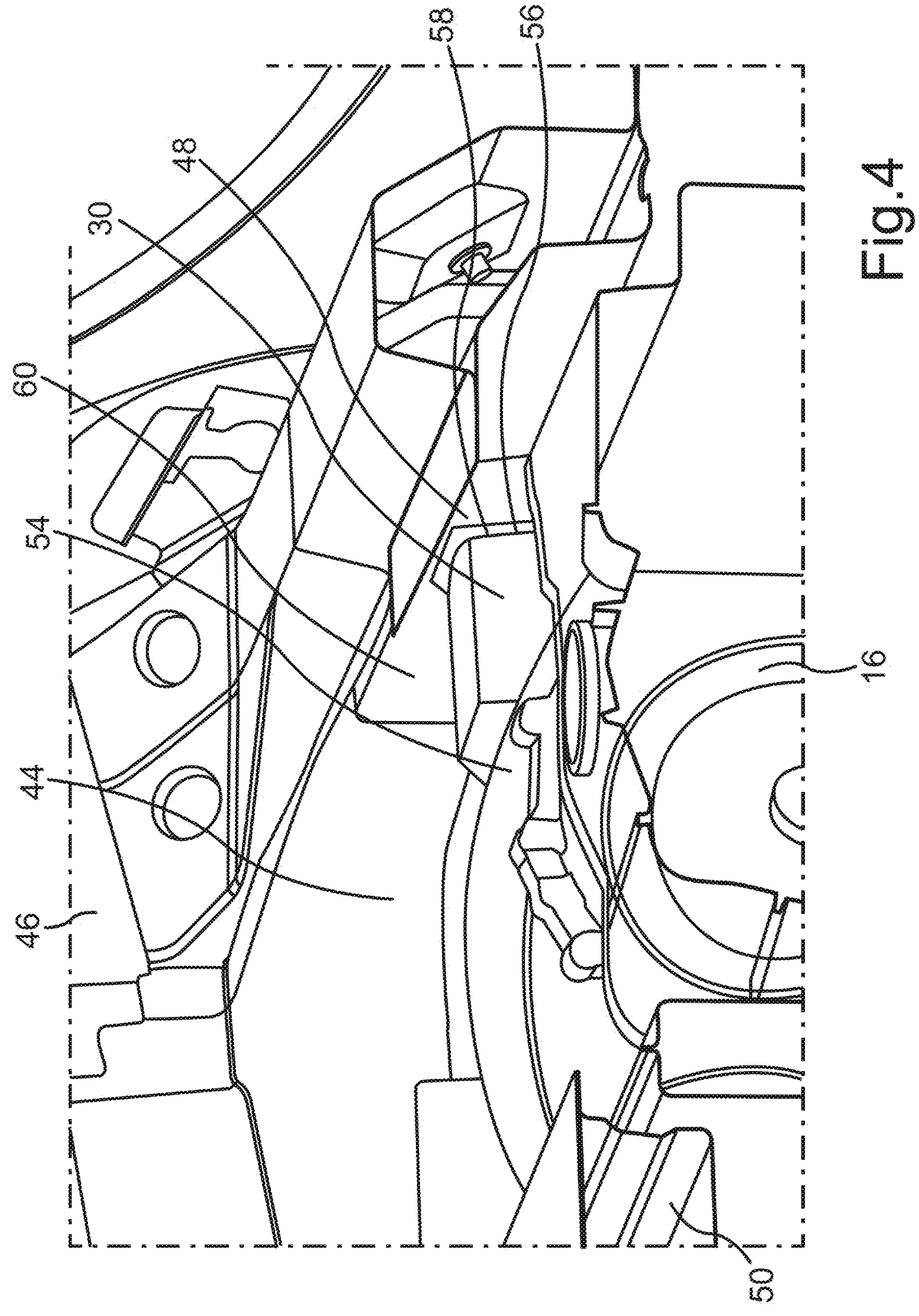
FIG. 4 shows a sectional and cutaway perspective view from diagonally behind of the fastening arrangement of the subframe on the motor car body according to FIGS. 1 to 3, showing, in particular, the arrangement of one of the two support elements on the associated side member of the subframe and the position thereof relative to the cross member.

Lastly, FIG. 4 shows in a sectional and perspective cutaway view from diagonally behind into the luggage compartment of one of the two support elements 30 of the support device 32, once again in the arrangement thereof in the region 54 of the corresponding side member 18 of the subframe 10. When viewed in the forwards direction of travel, in the present case the support element 30 can be seen on the left-hand side of the vehicle. The support elements 30 are designed as sheet-metal formed parts in the present case and are provided with corresponding openings, beads or the like, so that they can also be used in a targeted manner to absorb energy.

If there is now an accident-induced forward displacement of the subframe 10 together with the rear axle 12 as a result of a rear impact on the motor car or the motor car body, the support device 32 with the respective support elements 30 is displaced forwards towards the center of the vehicle, in the present case forwards in the vehicle longitudinal direction, according to an arrow 62 until the support elements 30 are supported on the cross member 48 as a result of this accident-induced movement. Of course, other parts such as the components 16 of the electric drivetrain or other chassis components are also or equally moved forwards in the vehicle longitudinal direction, as indicated by the arrow 64.

In order to avoid contact with or excessive damage to the rear end region 36 of the energy storage unit 38 as a result of the forward displacement of the subframe 10, the vehicle axle 12 or the components 16 of the electric drivetrain according to the arrow 64, the subframe 10 is supported by means of the support device 32 or by means of the respective support elements 30 provided in the present case above the side members 16 of the subframe 10. On the one hand, this support of the subframe 10 is intended to introduce corresponding accident forces via the support elements 30 of the support device 32 into the cross member 48 and from there, into the side members 44 of the rear structure 42 or into other load paths, in order to enable targeted support and absorption of impact energy, and, on the other hand, to reduce the accident-induced forward displacement of the subframe 10 with the vehicle axle 12 and the components 16 of the electronic drivetrain so that the energy storage unit 38 is not subjected to excessive forces and deformed, in particular in the rear end region 36.

As a result, the support device 32 offers a simple way of reducing the displacement of the subframe 10 relative to the energy storage unit 38 and thus avoiding excessive damage to the latter. In this case, the support device 32 with the support elements 30 provides an extremely lightweight and simple, yet highly effective solution.

It is clear that the support elements 30 can also be provided at another place on the subframe. Moreover, this concept can also be used for subframes arranged on a front-end structure of the motor car body.

The invention claimed is:

1. A motor car, comprising:
a body with a body structure element;
a rear axle subframe (10) for a vehicle rear axle (12), wherein the rear axle subframe (10) comprises a first side member (18), a second side member (18), a front cross member (20), and a rear cross member (22) and wherein the rear axle subframe (10) adjoins the body structure element via a region (52);
a fastening arrangement for fastening the rear axle subframe (10) to the body; and
an underfloor energy storage unit (38) for an electric drive of the motor car, wherein the rear axle subframe (10) adjoins the underfloor energy storage unit (38);
wherein the rear axle subframe (10) has a support device (32) with at least one support element (30);
wherein the at least one support element (30) is disposed on an upper side of one of the first and second side members (18) of the rear axle subframe (10), at a distance from the body structure element, and rearward of the body structure element in a longitudinal direction of the motor car;
wherein in an assembled state a first distance (A) between the rear axle subframe (10) and the underfloor energy storage unit (38) is greater than a second distance which is above the underfloor energy storage unit (38) in a vertical direction of the motor car between the at least one support element (30) on the upper side of one of the first and second side members of the rear axle subframe (10) and the body structure element of the body;
wherein, in an event of an accident-induced forward movement of the rear axle subframe (10) in the longitudinal direction of the motor car towards a center of the motor car as a result of a rear impact on the body of the motor car, the at least one support element (30) is displaced forward in the longitudinal direction of the motor car and provides support on the body structure element above the underfloor energy storage unit (38) in the vertical direction of the motor car such that the at least one support element (30) transfers a crash force of the rear impact into the body above the underfloor energy storage unit (38) in the vertical direction of the motor car via the body structure element before the rear axle subframe (10) hits the underfloor energy storage unit (38).

2. The motor car according to claim 1, wherein the at least one support element (30) comprises a first support element (30) and a second support element (30) and wherein the first support element (30) is disposed on the first side member (18) and the second support element (30) is disposed on the second side member (18).

3. The motor car according to claim 1, wherein the at least one support element (30) is an energy absorption element.

4. The motor car according to claim 1, wherein the body structure element is a cross member (48).

5. The motor car according to claim 4, wherein respective side members (44) of the body are connected to the cross member (48) and wherein the cross member (48) extends transversely to the side members (44) of the body.

6. The motor car according to claim 5, wherein the cross member (48) has respective mounting regions (60) adjoining the respective side members (44).

7. The motor car according to claim 1, wherein the at least one support element (30) is a sheet-metal formed part.

8. The motor car according to claim 1, wherein the at least one support element (30) is disposed on a region (54) of the one of the first and second side members (18) which slopes downwards towards the center of the motor car.

* * * * *